United States Patent

Berggren et al.

Patent Number: 5,752,480
Date of Patent: May 19, 1998

[54] DEVICE FOR SEALING A COMBUSTION CHAMBER OF A COMBUSTION ENGINE

[75] Inventors: Martin Berggren, Örnsköldsvik; Magnus Bergström, Saltsjöbaden; Karl-Erik Karlsson; Per Lange, both of Söderlälje; Göran Masus, Nykvarn, all of Sweden

[73] Assignee: Scania CV Aktiebolac, Sodertalde, Sweden

[21] Appl. No.: 730,502

[22] Filed: Oct. 11, 1996

[30] Foreign Application Priority Data

Oct. 13, 1995 [SE] Sweden .................. 9503622

[51] Int. Cl.⁶ .................................. F16J 15/04
[52] U.S. Cl. .................. 123/193.3; 277/235 B
[58] Field of Search .............. 123/193.3, 193.5, 123/668, 41.84; 277/235 B, 190, 191, 214, 236

[56] References Cited

U.S. PATENT DOCUMENTS

| 2,679,241 | 5/1954 | Dickson | 277/235 B |
| 3,586,338 | 6/1971 | Miklau | 277/235 B |
| 4,413,597 | 11/1983 | Stang et al. | 123/41.84 |
| 4,474,147 | 10/1984 | Hoopes | 277/235 B |
| 4,562,799 | 1/1986 | Woods et al. | 123/668 |
| 4,791,891 | 12/1988 | Kubis et al. | 123/41.84 |
| 4,867,118 | 9/1989 | Kubis et al. | 123/193.3 |
| 4,926,801 | 5/1990 | Eisenberg et al. | 123/41.84 |
| 5,402,754 | 4/1995 | Gunnarsson | 123/41.84 |

*Primary Examiner*—Marguerite McMahon
*Attorney, Agent, or Firm*—Ostrolenk, Faber, Gerb & Soffen, LLP

[57] ABSTRACT

Device for sealing a combustion chamber of a combustion engine, which combustion chamber is bounded by a cylinder liner, preferably replaceable and is surrounded by a cylinder block, a piston and a cylinder head. A disc-shaped sealing element is pressed in between the cylinder liner and the cylinder head, where either the liner or the cylinder head is provided with an annular protruding portion and the other one of them with a corresponding recess into which the sealing element is pressed. The protruding portion has a greater radial width than the recess.

16 Claims, 2 Drawing Sheets

DEVICE FOR SEALING A COMBUSTION CHAMBER OF A COMBUSTION ENGINE

BACKGROUND OF THE INVENTION

The invention relates to a device for sealing a combustion chamber of a combustion engine where the cylinder head is over the cylinder liner.

STATE OF THE ART

Combustion engines often incorporate a number of combustion chambers arranged in a cylinder block. Each combustion chamber is usually bounded radially by a cylinder liner supported with respect to the block, upwards by a cylinder head and downwards by a power-transmitting piston.

This arrangement means that there is a gap between, on the one hand, the cylinder head and, on the other hand, the cylinder liner and the cylinder block. This gap has to be sealed to prevent gases from leaking out from the combustion chamber, which might otherwise lead to disturbance of operation and breakdown.

This problem is generally greater in diesel engines than in Otto engines, since the former usually have a higher combustion pressure and operate under greater load.

One way of solving the problem is to insert a seal in the form of a steel plate disc between the cylinder liner and the cylinder head. This sealing plate is often subjected to deformation by pressing it between labyrinth-forming shoulders and recesses with the object of achieving increased tightness.

Such solutions involve having to subject the connection to a large clamping force which may lead to large force stresses and consequently increasing risks of fracture and cracking, e.g., at the support of the cylinder liner in the cylinder block. This applies particularly to engines in which the cylinder liner is supported by a supporting ledge close to the cylinder head, i.e. a so-called "top stop" liner.

In engines where the cylinder line is supported by a supporting ledge situated relatively far from the cylinder head, i.e., so called "mid stop" liner, the liner may only be subjected to a certain maximum clamping force. Otherwise, it risks suffering unfavorable deformation impairing its interaction with the piston, thereby possibly leading to the moving piston striking the liner, with the consequent possibility of shearing and risk of engine breakdown.

OBJECT OF THE INVENTION

The object of the invention is to provide a simple arrangement for sealing a combustion chamber of a combustion engine which succeeds in preventing gas leakage from the combustion chamber. This arrangement should as far as possible obviate any need for large clamping forces that might otherwise lead to fracture.

The invention is particularly devoted to improving tightness in engines in which the cylinder liner is removable and of the "mid stop" type.

SUMMARY OF THE INVENTION

The device according to the invention is for sealing a combustion chamber of a combustion engine. The combustion chamber is bounded by a cylinder liner, which is preferably replaceable and is surrounded by a cylinder block, a piston in the liner and a cylinder head. An annular, disc-shaped sealing element is pressed in between the cylinder liner and the cylinder head. Either the liner or the cylinder head is provided with an annular protruding portion and the other one of them with a corresponding recess into which the sealing element is pressed. The protruding portion has a greater radial width than the recess.

In particular, the outer diameter of the protruding portion is greater than that of the recess while the inner diameter of the protruding portion is smaller than that of the recess. The fact that the protruding portion is wider than the opposing recess and has a longer radial extent both inwards and outwards means that there are two circular clamping zones in which the sealing element may be compressed and this prevents gas leakage without unduly large power effects.

Placing the protruding portion on the cylinder liner and the recess in the cylinder head represents a simple production solution in that the cylinder head may be provided with a flat lower surface in which the recess may thereafter be formed.

The sealing disc may have a yield point below 250 MPa and preferably below 150 MPa. Using a relatively soft sealing disc with a low yield point makes it possible to achieve a good tightness where the seal fills the recess properly. This solution has advantages in the case of "mid stop" type cylinder liners in that the sealing disc may be deformed sufficiently by relatively small clamping forces.

There are advantageous dimensioning and detail solutions described below which, inter alia, ensure clamping zones both radially within and outside the recess.

Other features and advantages distinguishing the invention are indicated by the following description of an embodiment, which is described with reference to the attached drawings.

DESCRIPTION OF A PREFERRED EMBODIMENT

Figure 1:
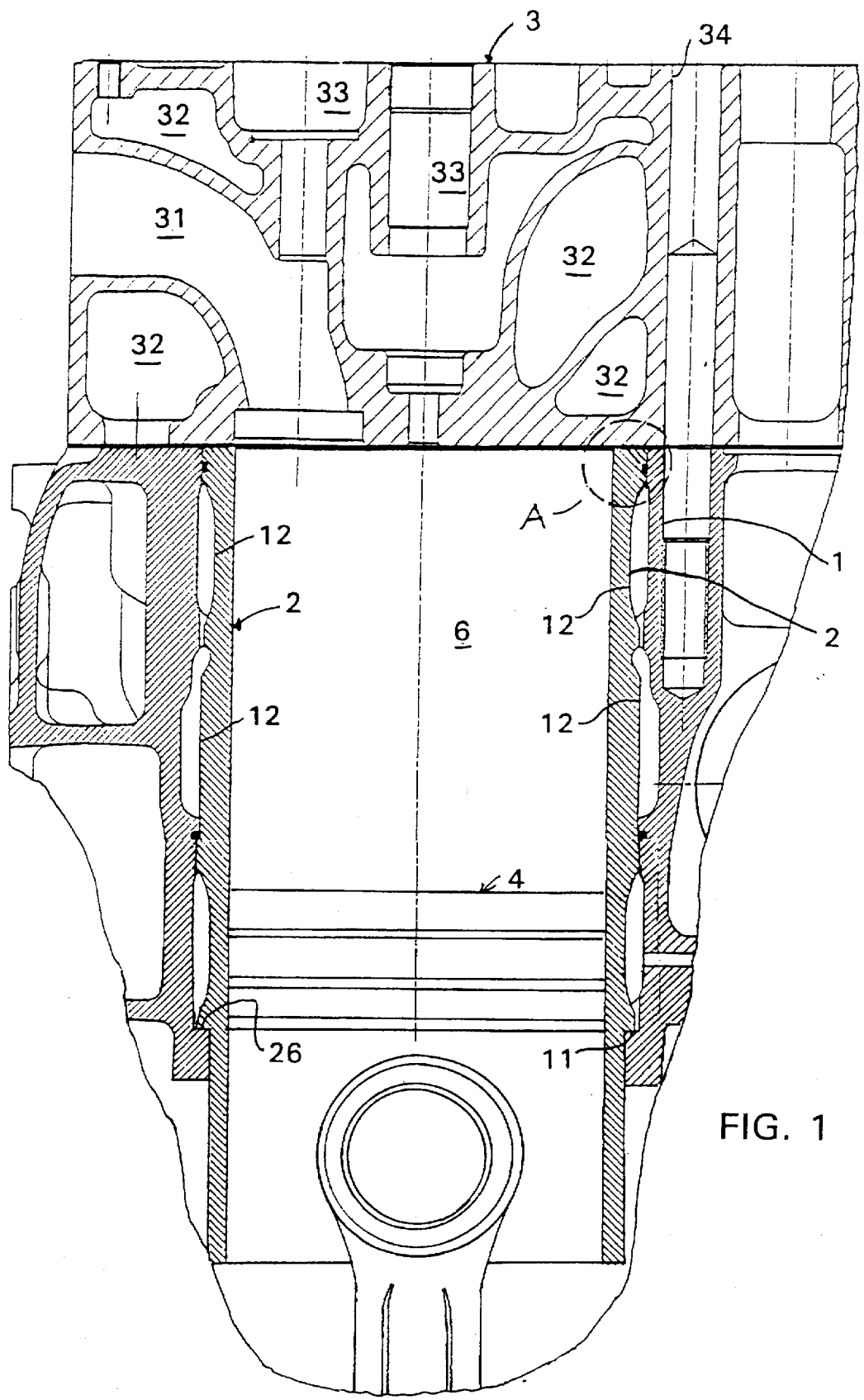
FIG. 1 shows a vertical section through a portion of a combustion engine.

This description mentions directions as upwards and downwards. These refer only to the drawings, which show a stationary engine. The invention is of course also applicable to engines with other physical orientations.

The drawings show a vertical section through one cylinder of a multi-cylinder and particularly a six-cylinder diesel engine (not shown) of the in-line type, intended for a heavy-duty vehicle such as a truck. The engine comprises a cylinder block, holding six substantially cylindrical combustion chambers 6 which are each bounded radially by a respective cylinder liner 2 supported in the block 1. Each combustion chamber 6 is bounded axially by a separate cylinder head 3 above it and a movable piston 4 below it arranged to transmit power to the driveline (not shown).

The cylinder liner 2 may advantageously take the form shown in SE 92 03 933, which refers to a cylinder liner of the so-called "mid stop" type. The liner is supported in the cylinder block by a circular contact surface 26 that faces downwards and that interacts with a contact surface 11 of the block. The surfaces 11, 26 are arranged in the vicinity of the lower reversing point of the piston 4. The cylinder 2 is surrounded by a number of cooling ducts 12 for cooling its upper hotter section.

The liner indicated in SE 92 03 933 is also replaceable, which is of course favorable for the total life of the engine.

The engine described has a separate cylinder head 3 for each combustion chamber 6. The cylinder head 3 is provided in a known manner with inlet and exhaust ducts 31 (only one of which is depicted in the diagrams), cooling ducts 32, recesses 33 for valve bodies and fuel injectors, and holes 34 for bolts for fastening the cylinder head to the cylinder block 1.

A disc shaped sealing element 5, here a metal disc according to the invention with a yield point below 250 MPa, preferably below 150 MPa, is arranged in the gap which is formed between, on the one hand, the cylinder head 3 and, on the other hand, the cylinder block 1 and the cylinder liner 2.

The object of the sealing disc 5 is to prevent gas leakage from the combustion chamber 6 to the environment. Such leakage might lead to disturbance of operation or breakdown, because of the possibility of gas reaching the cooling system and because of the great heat which occurs at the leakage point. The sealing disc 5 has advantageously the same extent as the lower surface 35 of the cylinder head 3.

Figure 2:
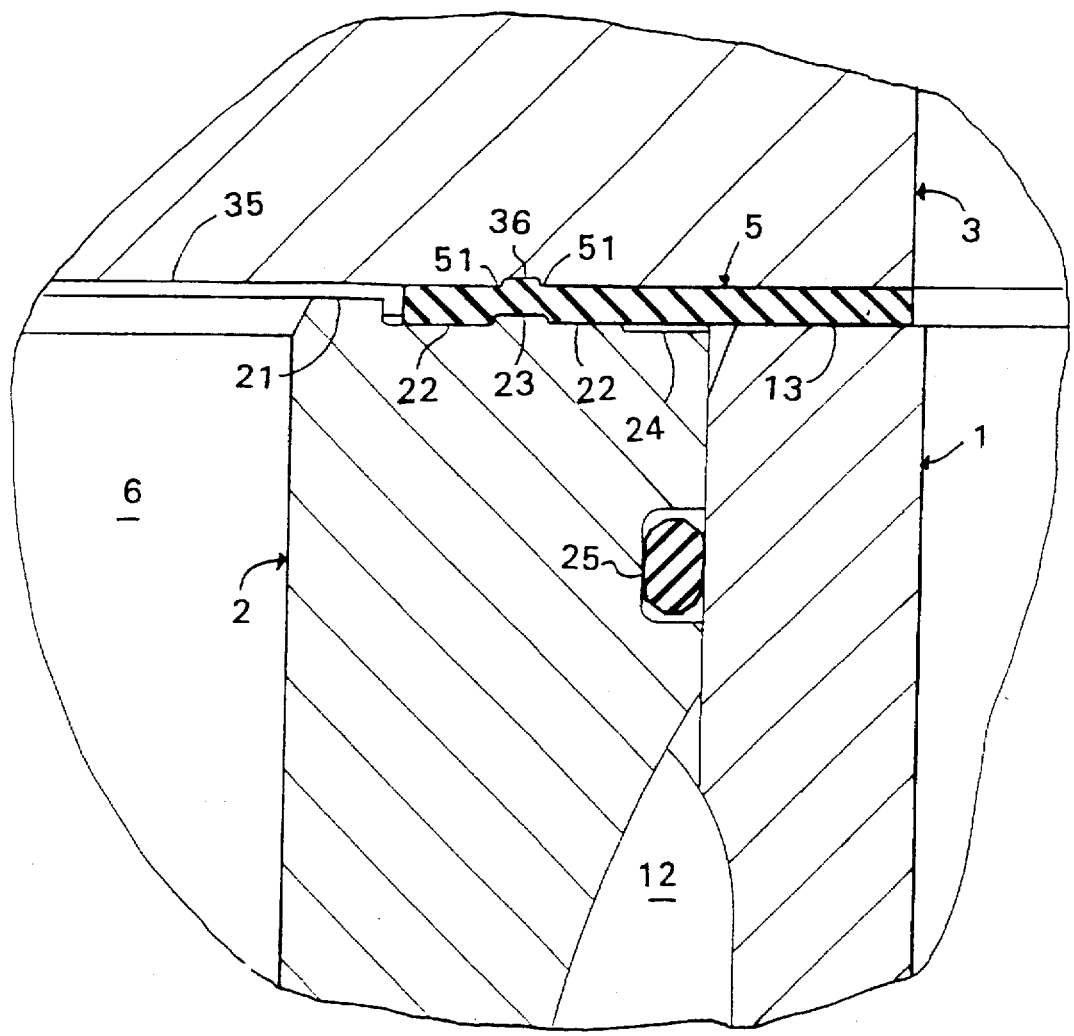
FIG. 2 shows an enlarged section of area A in FIG. 1.

FIG. 2 shows an enlarged view of the gas seal arrangement which in all essentials is arranged symmetrically in rotation about the center line of the combustion chamber 6.

The upper axial end portion of the cylinder liner is provided at its radial inner end with a protruding flange 21. The sealing disc 5 is arranged radially outside the protruding flange 21. The sealing disc 5 is pressed against a supporting surface 22 which in the vertical direction projects somewhat above the upper surface 13 of the cylinder block in this area. This is important in that the sealing disc 5 has to be pressed firmly between the cylinder head 3 and the cylinder block 1. Otherwise, it would not be possible to achieve sufficient tightness. In addition, a sealing ring 25 is arranged between the cylinder liner 2 and the cylinder block 1 with the object of preventing leakage from the upper cooling duct 12.

The upper supporting surface 22 is provided with an annular protruding portion 23 according to the invention. Substantially in the middle measured in the radial direction of this portion 23, the lower surface 35 of the cylinder head 3 is provided with an annular recess 36 with a smaller radial width than the protruding portion 23. The result is the formation of two annular clamping zones 51 where the sealing disc 5 is pressed against the protruding portion 23 but outside the recess 36. The sealing disc 5 is thus deformed so that it substantially fills the recess 36, thereby providing proper tightness in the two clamping zones 51.

The radially outer section 24 of the upper surface is somewhat lower than the supporting surface 22. The reason for this is the endeavor to place the power load of the cylinder liner as close to its mean radius as possible in order thereby to achieve favorable deformation of the cylinder liner 2. The endeavor is therefore to achieve substantially the same contact area between the cylinder liner 2 and the sealing disc both outside and within the radially middle part of the projecting portion 23, which may be achieved by suitable choice of radial width for the outer portion 24.

"Mid stop" cylinder liners may not be subjected to the same large clamping forces as "top stop" liners. The reason for this was described earlier. If an ordinary plate disc is used as a seal, it so hard that the maximum forces usable with "mid stop" liners will not deform the disc sufficiently to "fill" the recess 36. Moreover, there would only be line contact in the clamping zones, resulting in great sensitivity to defects and the consequent possibility of insufficient tightness.

A softer disc may therefore be used with "mid stop" liners. It is advantageous to use a copper disc or a mild carbon steel disc with a yield point below 150 MPa. The clamping force across the liner should be about 200–400 kN. The clamping force should be increased in cases of increased liner thickness or increased modulus of elasticity of the liner. The force should be reduced correspondingly in cases of reduced thickness or modulus of elasticity.

Experiments have shown that reduced clamping forces, due inter alia to softer seals, may be compensated by a larger area of clamping zones. The arrangement according to the invention with two clamping zones with an intermediate "filled" recess also means that leakage in one zone may be tolerated without impairing operation.

The fact that the protruding portion 23 and recess 36 are situated at the same nominal mean distance from the center line of the combustion chamber 6 minimizes the risk of unfortunate tolerances possibly leading to the recess 36 in the fitted position being partly within or outside the projecting portion 23.

Experiments with a multi-cylinder diesel engine with a swept volume of 2 liters per cylinder have shown that optimum tightness is achieved if the protruding portion 23 is shelf-like with a height in the range of 0.15–0.25 mm and preferably of about 0.2 mm and a radial width in the range of about 1.4 mm, whereby the recess is about 0.2 mm deep and about 1.0 mm wide. This results in the respective clamping zone having a radial width of about 0.2 mm. These experiments used a sealing disc 1.0 mm thick. Deviations from the measurements stated above should preferably be not more than one or a few tenths of a millimeter, although the thickness of the sealing disc may be between 0.5 and 2.0 mm depending on the type of engine.

In applications on other sizes or types of engines, other dimensions may be preferable but the mutual relationships should substantially correspond to those which may result from the measurements stated above. The radial width of the protruding portion 23 is advantageously not more than twice the radial width of the recess 36. Moreover, the height of the protruding portion 23 should not exceed the depth of the recess 36 nor be less than half of the latter's depth.

The embodiment described may be modified in various ways within the scope of the patent claims. Thus, the invention may be applied to other combustion engines, not merely diesel engines of the in-line type. A common cylinder head may also be used for two or more combustion chambers.

The location of the projecting portion and the recess may also be reversed. This makes no notable operating change but is disadvantageous from the production point of view n that it makes manufacturing the cylinder head more difficult. The change entails no corresponding simplification of cylinder liner manufacture.

Although the present invention has been described in relation to a particular embodiments thereof, many other variations and modifications and other uses will become apparent to those skilled in the art. It is preferred, therefore, that the present invention be limited not by the specific disclosure herein, but only by the appended claims.

What is claimed is:

1. A device for sealing a combustion chamber of a combustion engine, wherein the engine comprises a cylinder block, at least one cylinder liner in the block surrounding and defining a substantially cylindrical combustion chamber in the block;

a piston in the cylinder liner and located below and also defining the chamber; and a cylinder head above the cylinder liner and also defining the chamber;

the device for sealing comprising:

the cylinder head having a lower contact surface facing toward the cylinder liner, and the cylinder liner having an upper end surface that is opposite to and faces toward the lower contact surface of the cylinder head;

an annular sealing element pressed between the cylinder liner and the cylinder head;

one of the cylinder liner end surface and the cylinder head contact surface having a shelf-like annular protruding portion, and the opposite, facing one of the cylinder liner end surface and the cylinder head contact surface having an annular recess defined in it, wherein the protruding portion and the recess are generally correspondingly positioned radially with respect to the chamber, and such that the protruding portion has an outer diameter that is greater than the outer diameter of the recess and the protruding portion has an inner diameter that is smaller than the inner diameter of the recess, and the sealing element is clamped between for being deformed by the protruding portion protruding toward the recess.

2. The device of claim 1, wherein the sealing element has an outer diameter that is great enough that the sealing element also extends between and seals between the cylinder head and the cylinder block around the cylinder liner.

3. The device of claim 1, wherein the end surface of the cylinder liner has the protruding portion thereon and the contact surface of the cylinder head has the recess therein.

4. The device of claim 3, wherein the sealing element is substantially disk shaped.

5. The device of claim 4, wherein the sealing element has a yield point below 250 MPa.

6. The device of claim 4, wherein the sealing element has a yield point below 150 MPa.

7. The device of claim 5, wherein the sealing element disk has a thickness in the range of 0.5–2.0 mm.

8. The device of claim 5, wherein the sealing element disk has a thickness of about 1.0 mm.

9. The device of claim 1, wherein the cylinder liner is separate from the cylinder block; the cylinder liner having an annular contact surface which faces in the opposite direction to the end surface thereof;

the cylinder block having an opening therein for receiving the cylinder liner and the block having a surface that opposes and cooperates with the annular contact surface of the cylinder liner for positioning the cylinder liner in the cylinder block;

the piston is movable along the cylinder liner, the piston has a lower, reversing position where the combustion chamber is enlarged to the maximum, and the annular contact surface being positioned generally in the vicinity of the reversing position of the piston.

10. The device of claim 1, wherein the sealing element is substantially disk shaped.

11. The device of claim 10, wherein the protruding portion and the recess have substantially the same mean diameter.

12. The device of claim 11, wherein the disk and the cylinder liner are so shaped and placed and the protruding portion is so placed that there is substantially the same contact area between the cylinder liner and the disk radially outside and radially within the mean diameter of the protruding portion.

13. The device of claim 12, wherein the protruding portion is radially less than twice as wide as the width of the recess and has a height that is not greater than the depth of the recess and not less than half the depth of the recess.

14. The device of claim 1, wherein the protruding portion is radially less than twice as wide as the width of the recess and has a height that is not greater than the depth of the recess and not less than half the depth of the recess.

15. The device of claim 14, wherein the radial width of the protruding portion is in the range of 1.2–1.6 mm and its height is in the range of 0.15–0.25 mm, and the width of the recess is in the range of 0.8–1.2 mm and the depth of the recess is in the range of 0.15–0.25 mm.

16. The device of claim 14, wherein the radial width of the protruding portion is about 1.4 mm and its height is about 0.2 mm, and the width of the recess is about 1.0 mm and the depth of the recess is about 0.2 mm.

* * * * *